United States Patent
Cosgun et al.

(10) Patent No.: US 9,141,852 B1
(45) Date of Patent: Sep. 22, 2015

(54) PERSON DETECTION AND POSE ESTIMATION SYSTEM

(71) Applicant: Toyota Jidosha Kabushiki Kaisha, Aichi-ken (JP)

(72) Inventors: Akansel Cosgun, Atlanta, GA (US); Emrah Akin Sisbot, Mountain View, CA (US)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/012,194

(22) Filed: Aug. 28, 2013

Related U.S. Application Data

(60) Provisional application No. 61/785,344, filed on Mar. 14, 2013.

(51) Int. Cl.
 *G06K 9/00* (2006.01)
(52) U.S. Cl.
 CPC ........ *G06K 9/00335* (2013.01); *G06K 9/00362* (2013.01)

(58) Field of Classification Search
 None
 See application file for complete search history.

(56) References Cited

U.S. PATENT DOCUMENTS

| | | | |
|---|---|---|---|
| 6,198,395 B1 | 3/2001 | Sussman | |
| 6,320,496 B1 | 11/2001 | Sokoler et al. | |
| 6,486,784 B1 | 11/2002 | Beckers | |
| 6,662,141 B2 | 12/2003 | Kaub | |
| 6,744,370 B1 | 6/2004 | Sleichter, III et al. | |
| 6,774,788 B1 | 8/2004 | Balfe | |
| 7,610,151 B2 | 10/2009 | Letchner et al. | |
| 7,986,828 B2* | 7/2011 | Rao et al. | 382/159 |
| 8,166,421 B2* | 4/2012 | Magal et al. | 715/863 |
| 8,583,661 B2 | 11/2013 | Fujii et al. | |
| 2002/0076100 A1* | 6/2002 | Luo | 382/164 |
| 2003/0037720 A1 | 2/2003 | Stockton | |
| 2004/0091153 A1* | 5/2004 | Nakano et al. | 382/228 |
| 2004/0210358 A1 | 10/2004 | Suzuki et al. | |
| 2006/0149621 A1 | 7/2006 | Do et al. | |
| 2008/0004802 A1 | 1/2008 | Horvitz | |
| 2008/0112592 A1* | 5/2008 | Wu et al. | 382/103 |
| 2008/0120025 A1 | 5/2008 | Naitou et al. | |

(Continued)

OTHER PUBLICATIONS

Koenig, "Toward Real-time Human Detection and Tracking in Diverse Environments," IEEE 6th Int'l Conf. on Development and Learning (2007), pp. 94-98.*

(Continued)

*Primary Examiner* — Vu Le
*Assistant Examiner* — Alexander J Lesnick
(74) *Attorney, Agent, or Firm* — Patent Law Works LLP

(57) ABSTRACT

A system for detecting a person and estimating pose information comprises a processor and a memory storing instructions causing the system to: retrieve depth data from a sensor, the depth data describing distance information associated with one or more objects detected by the sensor; cluster the depth data to determine two or more candidate leg clusters, each candidate leg cluster including a portion of the depth data that may represent a human leg detected by the sensor; identify a candidate leg cluster pair including two candidate leg clusters within a certain distance between each other; determine whether there is a connectivity between the two candidate leg clusters included in the candidate leg cluster pair; and responsive to determining that there is a connectivity between the two candidate leg clusters, determine that the candidate leg cluster pair is qualified to be a leg cluster pair representing a person.

17 Claims, 10 Drawing Sheets

(56) References Cited

U.S. PATENT DOCUMENTS

| | | | |
|---|---|---|---|
| 2008/0120029 | A1 | 5/2008 | Zelek et al. |
| 2008/0312709 | A1 | 12/2008 | Volpe et al. |
| 2009/0252423 | A1* | 10/2009 | Zhu et al. ............... 382/209 |
| 2010/0106603 | A1 | 4/2010 | Dey et al. |
| 2010/0302138 | A1* | 12/2010 | Poot et al. ............... 345/156 |
| 2010/0332126 | A1 | 12/2010 | Huang et al. |
| 2011/0044506 | A1* | 2/2011 | Chen ............... 382/103 |
| 2011/0054781 | A1 | 3/2011 | Ohkubo |
| 2011/0210915 | A1* | 9/2011 | Shotton et al. ............ 345/157 |
| 2011/0213628 | A1 | 9/2011 | Peak et al. |
| 2011/0249865 | A1* | 10/2011 | Lee et al. ............... 382/103 |
| 2011/0307172 | A1 | 12/2011 | Jadhav et al. |
| 2011/0309926 | A1 | 12/2011 | Eikelenberg et al. |
| 2011/0317871 | A1* | 12/2011 | Tossell et al. ............ 382/103 |
| 2012/0070070 | A1* | 3/2012 | Litvak ............... 382/154 |
| 2012/0095681 | A1 | 4/2012 | An et al. |
| 2012/0150429 | A1 | 6/2012 | Siotos |
| 2012/0184884 | A1 | 7/2012 | Dyer et al. |
| 2013/0000156 | A1 | 1/2013 | Andoh |
| 2013/0218456 | A1 | 8/2013 | Zelek et al. |
| 2013/0265225 | A1 | 10/2013 | Nasiri et al. |
| 2013/0317944 | A1 | 11/2013 | Huang et al. |
| 2014/0009268 | A1 | 1/2014 | Oshima et al. |
| 2014/0018985 | A1 | 1/2014 | Gupta et al. |
| 2014/0114574 | A1 | 4/2014 | Tertoolen et al. |
| 2014/0180526 | A1 | 6/2014 | Deshpande et al. |

OTHER PUBLICATIONS

Fritsch, "Multi-modal anchoring for human-robot interaction," Robotics and Autonomous Systems 43 (2003) 133-147.*

Balachandran, Wamadeva et al., "A GPS Based Navigation Aid for the Blind," 17th International Conference on Applied Electromagnetics and Communications, Croatia, Oct. 1-3, 2003, pp. 34-36.

Edwards, Nathan et al., "A Pragmatic Approach to the Design and Implementation of a Vibrotactile Belt and Its Applications," 6 pages, Published 2009.

Heuten, Wilko et al., "Tactile Wayfinder: A Non-Visual Support System for Wayfinding," Proceedings: NordiCHI 2008, Oct. 20-22, 2008, 10 pages.

Koenig, Nathan, "Toward Real-Time Human Detection and Tracking in Diverse Environments," 5 pages, Published 2007.

Kulyukin, Vladimir et al., "A Robotic Wayfinding System for the Visually Impaired," 6 pages, Published 2004.

Melvin, A. Allan et al., "ROVI: A Robot for Visually Impaired for Collision-Free Navigation," Proceedings of the International Conference on Man-Machine Systems (ICoMMS), Malaysia, Oct. 11-13, 2009, 6 pages.

Pandey, Amit Kumar et al., "Towards a Sociable Robot Guide which Respects and Supports the Human Activity," 5th Annual IEEE Conference on Automation Science and Engineering, India, Aug. 22-25, 2009, 6 pages.

Rosenthal, Jacob et al., "Design Implementation and Case Study of a Pragmantic Vibrotactile Belt, " 10 pages, Published 2011.

Spinello, Luciano et al., "A Layered Approach to People Detection in 3D Range Data," 6 pages, Published 2010.

Tsukada, Koji et al., "ActiveBelt: Belt-type Wearable Tactile Display for Directional Navigation," 16 pages, Published 2004.

Ulrich, Iwan et al., "The GuideCane—Applying Mobile Robot Technoloiges to Assist the Visually Impaired," IEEE Transactions on Systems, Man and Cybernetics—Part A: Systems and Humans, vol. 31, No. 2, Mar. 2001 pp. 131-136.

Van Erp, Jan B.F. et al., "Waypoint Naviation with a Virobtactile Waist Belt," ACM Transactions on Applied Perception, vol. 2, No. 2, Apr. 2005, pp. 106-117.

Pielot et al., "Evaluation of Continuation Direction Encoding with Tactile Belts", Jan. 2008 (11 pages).

Xia et al., "Human Detection Using Depth Information by Kinect." Computer Vision and Pattern Recognition Workshops (CVPRW), 2011 IEEE Computer Society Conference on. IEEE, 2011 (8 pages).

* cited by examiner

PERSON DETECTION AND POSE ESTIMATION SYSTEM

CROSS REFERENCE TO RELATED APPLICATION

This application claims priority under 35 USC §119(e) to U.S. Application No. 61/785,344, entitled "Free Moving Guide Robot" filed Mar. 14, 2013, the entirety of which is herein incorporated by reference.

BACKGROUND

1. Field of the Invention

The specification relates to person detection systems. In particular, the specification relates to a system and method for detecting a person through a leg connectivity test based at least in part on depth data from a sensor and estimating pose information for the detected person.

2. Description of the Background Art

Today many computer systems and machines rely on person detection techniques. Under many situations, machines and computer systems need to know if there is a human present at a particular location in order to turn on/off or activate a particular program if a human or humans are present or absent. Therefore, the machines and computer systems are often equipped with a particular sensor for measuring surrounding objects and loaded with a program for processing data from the sensor to detect whether a human is present. For example, a surveillance system is equipped with a consumer camera. The surveillance system can automatically adjust the focus of the consumer camera when detecting humans and further identify the humans. Examples for such machines and computer systems can also include an automobile safety system that monitors a driver's status; and a robotic application that needs an accurate detection and pose estimation of humans. These machines and computer systems apply drastically different methods based on different types of sensors equipped.

Among these machines and computer systems, there are several of them designed to detect one or multiple persons based on a depth image. The existing method is to utilize red-green-blue color and depth ("RGB-D") information of pixels composing the image to fit a skeleton model of a human. This method often requires the visibility of the whole body of a human. Therefore, one of the main problems of the existing method is that this method becomes inapplicable if a human's body is not entirely visible because of occlusions or because of the sensor's limited field of view. Especially, when the sensor is placed at a low position, the existing machines and computer systems are unable to detect the position of the human and thus unable to calculate pose information for the human.

Another main problem of the existing methods is that the existing methods often require a training session or prior knowledge before being able to detect persons and estimate pose information for the persons.

SUMMARY OF THE INVENTION

The specification overcomes the deficiencies and limitations of the prior art at least in part by providing a system and method for detecting a person through a connectivity test based on depth data and estimating pose information for the person. The system comprises a processor and a memory storing instructions that, when executed, cause the system to: retrieve depth data from a sensor, the depth data describing distance information associated with one or more objects detected by the sensor; cluster the depth data to determine two or more candidate leg clusters, each candidate leg cluster including a portion of the depth data that may represent a human leg detected by the sensor; identify a candidate leg cluster pair based on the two or more candidate leg clusters, the candidate leg cluster pair including two candidate leg clusters within a certain distance between each other; determine whether there is a connectivity between the two candidate leg clusters included in the candidate leg cluster pair; and responsive to determining that there is a connectivity between the two candidate leg clusters included in the candidate leg cluster pair, determine that the candidate leg cluster pair is qualified to be a leg cluster pair representing a person detected by the sensor.

In general, another innovative aspect of the subject matter described in this disclosure may be embodied in methods that include: retrieving depth data from a sensor, the depth data describing distance information associated with one or more objects detected by the sensor; clustering the depth data to determine two or more candidate leg clusters, each candidate leg cluster including a portion of the depth data that may represent a human leg detected by the sensor; identifying a candidate leg cluster pair based on the two or more candidate leg clusters, the candidate leg cluster pair including two candidate leg clusters within a certain distance between each other; determining whether there is a connectivity between the two candidate leg clusters included in the candidate leg cluster pair; and responsive to determining that there is a connectivity between the two candidate leg clusters included in the candidate leg cluster pair, determining that the candidate leg cluster pair is qualified to be a leg cluster pair representing a person detected by the sensor.

The system and method are particularly advantageous in numerous respects. First, the system and method do not require any training or prior knowledge. Second, the system and method have a significantly low number of false positives, which is often seen in leg based detection systems and methods. Third, the system and method do not require a full view of humans from the sensor, while being able to detect humans with partial visibility (e.g., only lower body of the humans). Fourth, the system and method do not require color information from the sensor. Fifth, the system and method are particularly useful in situations where the sensor is mounted at a low height.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
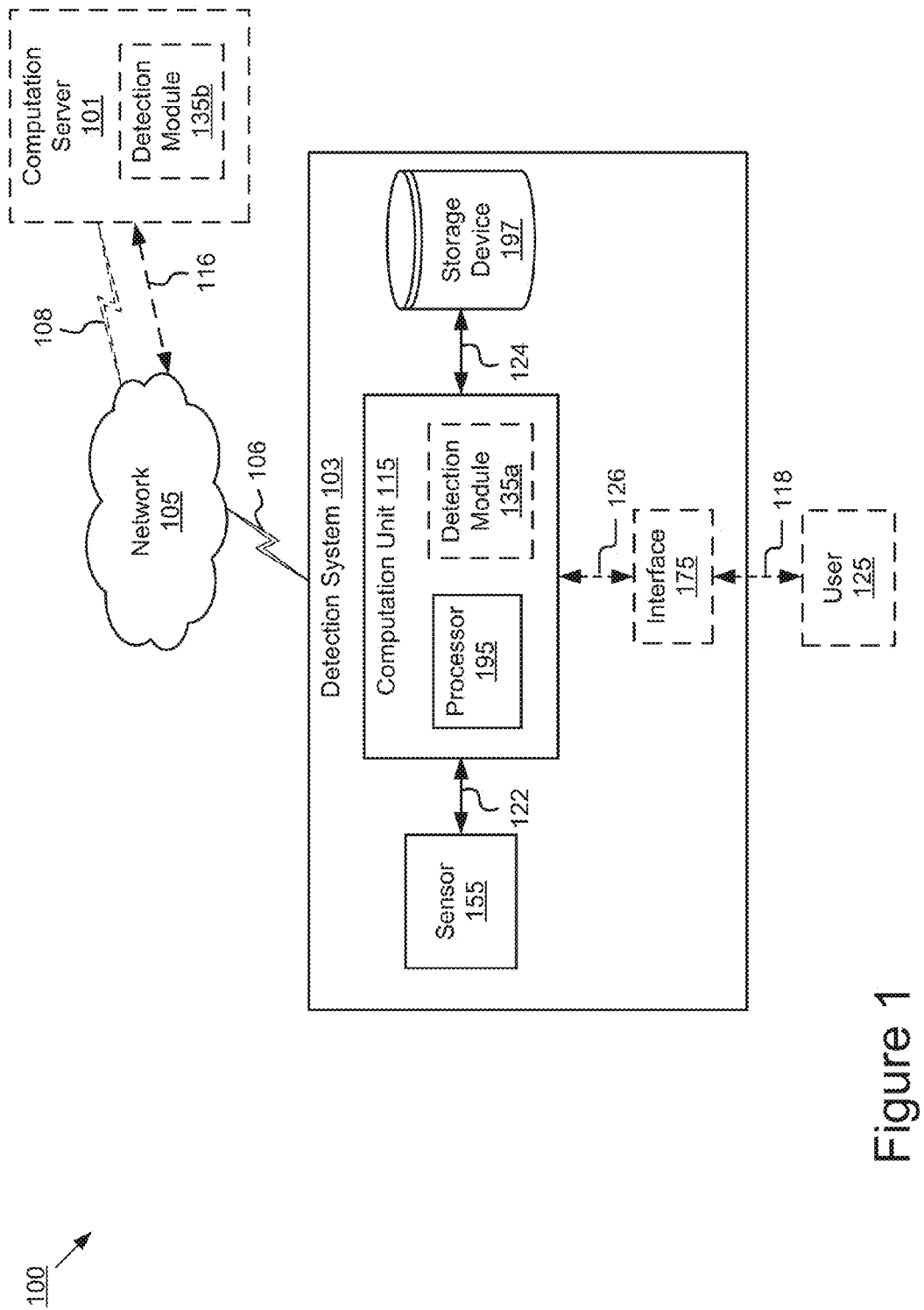
FIG. 1 is a high-level block diagram illustrating a system for detecting persons and estimating pose information for the persons according to one embodiment.

A system and method for detecting a person through a connectivity test based on depth data and estimating pose information for the person is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, compact disc read-only memories (CD-ROMs), magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for detecting persons and estimating pose information for the persons according to one embodiment. The illustrated system 100 includes a detection system 103 that is optionally accessed by a user 125, and a computation server 101. In the illustrated embodiment, the detection system 103 and the computation server 101 are communicatively coupled via a network 105. For example, the detection system 103 and the computation server 101 are communicatively coupled to each other via the network 105 to facilitate the detection system 103 to transmit sensor data to the computation server 101 for processing the sensor data and also to facilitate the computation server 101 to send the processed data and/or any results from the processed data to the detection system 103 for determining if any objects have been detected. The computation server 101 is depicted in FIG. 1 using dashed lines to indicate that the computation server 101 is an optional component for the system 100. In some embodiments, the system 100 does not include a computation server 101. In such embodiments, the detection system 103 processes the sensor data and determines if any objects have been detected based on the processing of the sensor data.

Although one detection system 103 and one computation server 101 are illustrated in FIG. 1, persons having ordinary skill in the art will recognize that any number of detection systems 103 and computation servers 101 can be communicatively coupled to the network 105. Furthermore, while only one network 105 is coupled to the detection system 103 and the computation server 101, persons having ordinary skill in the art will appreciate that any number of networks 105 can be connected to the detection system 103 and the computation server 101.

The network 105 is a conventional type, wired or wireless, and may have any number of configurations such as a star configuration, token ring configuration or other configurations known to those skilled in the art. Furthermore, the network 105 may comprise a local area network ("LAN"), a wide area network ("WAN") (e.g., the Internet), and/or any other interconnected data path across which multiple devices may communicate. In yet another embodiment, the network 105 may be a peer-to-peer network. The network 105 may also be coupled to or include portions of a telecommunications network for sending data in a variety of different communication protocols. For example, the network 105 is a 3G network or a 4G network. In another embodiment, the network 105 includes Bluetooth communication networks or a cellular communications network for sending and receiving data such as via short messaging service ("SMS"), multimedia messaging service ("MMS"), hypertext transfer protocol ("HTTP"), direct data connection, WAP, e-mail, etc. In yet another embodiment, all or some of the links in the network 105 are encrypted using conventional encryption technologies such as secure sockets layer ("SSL"), secure HTTP and/or virtual private networks ("VPNs").

In the illustrated embodiment, the detection system 103 is communicatively coupled to the network 105 via signal line 106 (wirelessly). The user 125 interacts with the detection system 103 as represented by signal line 118. In the illustrated embodiment, the computation server 101 is communicatively coupled to the network 105 via signal line 116 and signal line 108 (wirelessly). In some embodiments, signal lines 106 and 108 are any combination of wireless communication channels such as one or more of a 3G, 4G, GPS, DSRC or any other appropriate wireless network communication channels.

The detection system 103 is any system including a sensor 155 and that has a capability of detecting objects via the sensor 155. In some embodiments, the detection system 103 is an intelligent vehicle. For example, the detection system 103 is an intelligent car having a capability of detecting a driver or passenger inside the car. In some embodiments, the detection system 103 is a social robot that can cooperate with humans and/or other robots to finish any appropriate tasks. In some embodiments, the detection system 103 is an autonomous system operating in populated environments. In some embodiments, the detection system 103 is incorporated in other systems as a component for detecting objects. For example, the detection system 103 is embedded in a machine or computer system for detecting if a person or persons are present at a particular location and the machine or computer system can turn on/off or activate a particular program if a person or persons are present at the particular location.

In some embodiments, the detection system 103 includes a sensor 155, a computation unit 115 that comprises a processor 195 and a detection module 135*a* (also referred to herein individually and collectively as 135), a storage device 197 and optionally an interface 175. In some embodiments, the detection module 135 can be stored on the computation server 101. For example, the detection module 135*b* can be stored on the computation server 101. Although one computation unit 115, one sensor 155, one storage device 197 and one interface 175 are depicted in FIG. 1, persons having ordinary skill in the art will recognize that the detection system 103 can include any number of computation units 115, sensors 155, storage devices 197 and interfaces 175. Furthermore, persons having ordinary skill in the art will also appreciate that the detection system 103 may include other entities not shown in FIG. 1 such as a speaker, a display device, an input/output device, etc. For example, the detection system 103 also includes a transceiver unit and an antenna for communication with the computation server 101 or any other appropriate systems (not pictured) communicatively coupled to the network 105.

In the illustrated embodiment, the sensor 155 is communicatively coupled to the computation unit 115 via signal line 122. The storage device 197 is communicatively coupled to the computation unit 115 via signal line 124. The interface 175 is communicatively coupled to the computation unit 115 via signal line 126. The user 125 interacts with the interface 175 as represented by signal line 118.

The sensor 155 is any type of conventional sensor configured to collect any type of data. For example, the sensor 155 is one of the following: an ultrasound sensor, a color camera, a monocular/stereo camera, a three-dimensional ("3D") depth sensor, an infrared ("IR") camera, a two-dimensional ("2D")/3D laser, etc. Persons having ordinary skills in the art will recognize that other types of sensors are possible. In some embodiments, the detection system 103 includes a combination of different types of sensors 155. In some embodiments, the sensor 155 measures and generates sensor data. In some embodiments, the sensor 155 is a camera that generates color image data describing red-green-blue color ("RGB") values for image pixels. In some embodiments, the sensor 155 is a 3D depth sensor that generates 3D depth data describing distance information associated with objects captured by the sensor 155. For example, the 3D depth data is a 3D depth point cloud in form of an array of triplets or spatial coordinates. In another example, the 3D depth data is a depth image where the column and row number of each pixel represent its x and y coordinates and the value of the pixel represents its z coordinate. In some embodiments, the sensor 155 is a RGB-Depth camera that provides both the RGB values and the depth data for the pixels in the image. In some embodiments, the sensor 155 sends the depth data describing distance information associated with objects captured by the sensor 155 to the computation unit 115 for processing the depth data to detect objects. In some embodiments, the depth data can be sent to the computation server 101 for processing.

The computation unit 115 is any processor-based computing device. In some embodiments, the computation unit 115 is implemented using a single integrated circuit such as a system-on-chip ("SOC"). In one embodiment, the computation unit 115 receives sensor data from the sensor 155 and processes the sensor data. In some embodiments, the computation unit 115 stores the processed sensor data and/or any results based on the processed sensor data in the storage device 197. For example, the computation unit 115 receives depth data from the sensor 155. The computation unit 115 processes the depth data and detects objects based on the depth data. The computation unit 115 stores the depth data and/or information describing detected objects in the storage device 197. In some embodiments, the computation unit 115 comprises, among other things, the processor 195 and the detection module 135. In some embodiments, the computation unit 115 includes other components conventional to a computation unit such as a memory (not pictured) and an I/O interface (not pictured).

The processor 195 comprises an arithmetic logic unit, a microprocessor, a general purpose controller or some other processor array to perform computations, retrieve data stored on the storage device 197, etc. The processor 195 processes data signals and may comprise various computing architectures including a complex instruction set computer (CISC) architecture, a reduced instruction set computer (RISC) architecture, or an architecture implementing a combination of instruction sets. Although only a single processor 195 is shown in FIG. 1, multiple processors 195 may be included. The processing capability of the processor 195 may be limited to supporting the display of signals and the capture and transmission of signals. The processing capability of the processor 195 might be enough to perform more complex tasks, including various types of feature extraction and sampling. It will be obvious to one skilled in the art that other processors, operating systems, sensors, displays and physical configurations are possible.

The detection module 135 is code and routines for detecting persons and estimating pose information for the persons based on depth data. For example, the detection module 135 clusters the depth data to determine two or more candidate leg clusters. Each candidate leg cluster includes a portion of the depth data that may represent a human leg. The detection module 135 identifies a candidate leg cluster pair from the two or more candidate leg clusters. The candidate leg cluster pair includes two candidate leg clusters that are within a certain distance between each other, e.g., within 0.4 meter or any value in a range between 0.01 meter and 1000 meters. The detection module 135 also determines whether there is connectivity between the two candidate leg clusters included in the candidate leg cluster pair. Responsive to determining that there is connectivity between the two candidate leg clusters included in the candidate leg cluster pair, the detection module 135 determines that the candidate leg cluster pair is qualified to be a leg cluster pair indicating a person captured by the sensor 155. The detection module 135 will be described in further detail below with reference to FIGS. 2-9.

The interface 175 is a device configured to handle communications between the user 125 and the computation unit 115. For example, the interface 175 includes one or more of a screen for displaying detection information to the user 125; a microphone for outputting voice information to the user 125; and any other input/output components facilitating the communications with the user 125. In some embodiments, the interface 175 is configured to transmit an output from the computation unit 115 to the user 125. For example, the interface 175 includes an audio system for playing a voice greeting to the user 125 responsive to the computation unit 115 detecting that the user 125 is within the vicinity. One having ordinary skill in the art will recognize that the interface 212 may include other types of devices for providing the functionality described herein.

The user 125 is a human user. In one embodiment, the user 125 is driver or a passenger sitting in a vehicle on a road. In another embodiment, the user 125 is a human that interacts with a robot. The user 125 interacts with, or otherwise sends inputs to or receives outputs from, the interface 175 which sends and receives different types of data to and from the computation unit 115.

The storage device 197 is a non-transitory memory that stores data. For example, the storage device 197 is a dynamic random access memory (DRAM) device, a static random access memory (SRAM) device, flash memory or some other memory device known in the art. In one embodiment, the storage device 197 also includes a non-volatile memory or similar permanent storage device and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device known in the art.

The computation server 101 is any computing device having a processor (not pictured) and a computer-readable storage medium (not pictured) to facilitate the detection system 103 to detect persons and estimate pose information for the persons. In some embodiments, the computation server 101 includes a detection module 135b. In some embodiments, the computation server 101 receives depth data from the detection system 103, processes the depth data and sends any result of processing to the detection system 103.

Detection Module 135

Figure 2:
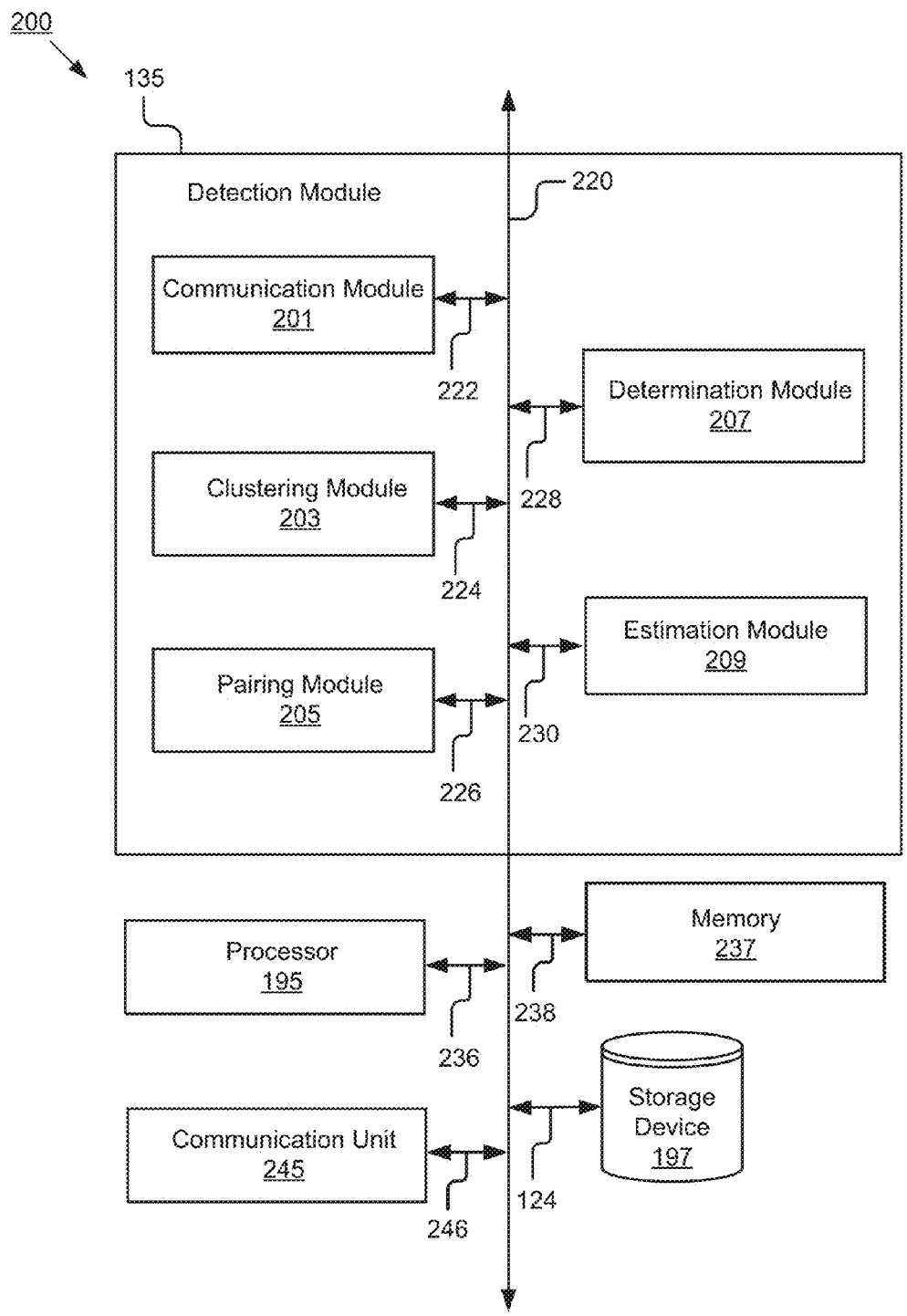
FIG. 2 is a block diagram illustrating a detection module according to one embodiment.

Referring now to FIG. 2, one embodiment of the detection module 135 is shown in more detail. FIG. 2 is a block diagram of a computing device 200 that includes a detection module 135, a processor 195, a memory 237, a communication unit 245 and a storage device 197 according to the illustrated embodiment. The components of the computing device 200 are communicatively coupled by a bus 220. In some embodiments, the computing device 200 can be one of a detection system 103 and a computation server 101. In the illustrated embodiment, the processor 195 is communicatively coupled to the bus 220 via signal line 236. The storage device 197 is communicatively coupled to the bus 220 via signal line 124. The memory 237 is communicatively coupled to the bus 220 via signal line 238. The communication unit 245 is communicatively coupled to the bus 220 via signal line 246.

The memory 237 stores instructions and/or data that may be executed by the processor 195. The memory 237 is coupled to the bus 220 for communication with the other components via signal line 238. The instructions and/or data may include code for performing the techniques described herein. The memory 237 may be a dynamic random access memory (DRAM) device, a static random access memory (SRAM) device, flash memory or some other memory device. In some embodiments, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 245 transmits and receives data to and from at least one of the detection system 103 and the computation server 101 depending upon where the detection module 135 may be stored. The communication unit 245 is coupled to the bus 220 via signal line 246. In some embodiments, the communication unit 245 includes a wireless transceiver for exchanging data with the computation server 101 or other communication channels using one or more wireless communication methods, including IEEE 802.11, IEEE 802.16, BLUETOOTH® or another suitable wireless communication method.

In some embodiments, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some embodiments, the communication unit 245 includes a wired port and a wireless transceiver. The communication unit 245 also provides other conventional connections to the network 105 for distribution of files and/or media objects using standard network protocols including TCP/IP, HTTP, HTTPS and SMTP, etc.

In the illustrated embodiment shown in FIG. 2, the detection module 135 comprises a communication module 201, a clustering module 203, a pairing module 205, a determination module 207 and an estimation module 209. These components of the detection module 135 are communicatively coupled to a bus 220 for communication with one another.

The communication module 201 is code and routines for handling communication between components of the detection module 135 and other components of the computing device 200. In some embodiments, the communication module 201 can be instructed by the clustering module 203 to retrieve sensor data from the sensor 155 (or any non-transitory storage medium that stores the sensor data). For example, the communication module 201 retrieves 3D depth data describing distance information associated objects captured by the 3D depth sensor 155 and delivers the 3D depth data to the clustering module 203. In some embodiments, the communication module 201 receives pose information for one or more detected persons from the estimation module 209 and delivers the pose information to the interface 175. In some embodiments, the communication module 201 stores the pose information in the storage device 197. The communication module 201 is communicatively coupled to the bus 220 via signal line 222.

In some embodiments, the communication module 201 also handles the communications between other sub-modules 203, 205, 207 and 209 in the detection module 135. For example, the communication module 201 communicates with the pairing module 205 and the determination module 207 to pass an output of the pairing module 205 (e.g., date describing a candidate leg cluster pair) to the determination module 207. This description may occasionally omit mention of the communication module 201 for purposes of clarity and convenience. For example, for purposes of clarity and convenience, the above scenario may be described as the pairing module 205 passing an output (e.g., date describing a candidate leg cluster pair) to the determination module 207.

The clustering module 203 is code and routines for processing retrieved depth data to determine candidate leg clusters. In some instances processing retrieved depth data to determine candidate leg clusters includes clustering the retrieved depth data, grouping the retrieved depth data, analyzing the retrieved depth data, etc. For example, the clustering module 203 clusters retrieved depth data to determine candidate leg clusters. A candidate leg cluster includes a portion of the depth data that may represent a human leg captured by the sensor 155. In some embodiments, the clustering module 203 groups depth data into clusters representing objects captured by the sensor 155 and filters the clusters to determine candidate leg clusters that may represent human legs measured by the sensor 155. In some embodiments, the clustering module 203 sends data describing the candidate leg clusters to the pairing module 205 for forming candidate leg cluster pairs. In some embodiments, the clustering module 203 stores the data describing the candidate leg clusters in the storage device 197. The clustering module 203 is communicatively coupled to the bus 220 via signal line 224.

In some embodiments, the depth data is a three-dimensional ("3D") point cloud data. For example, the depth data is a 3D depth point cloud in form of an array of triplets or spatial coordinates. The 3D point cloud includes points where each of the points has 3D spatial coordinates. In some embodiments, the clustering module 203 projects the 3D point cloud data to a two-dimensional ("2D") plane. For example, the clustering module 203 projects points included in the 3D point cloud to a 2D plane. As a result, the points in the 3D point cloud match points in the 2D plane. In some embodiments, the clustering module 203 projects points falling in a certain range of height to the 2D plane. For example, the certain range of height can be between two predetermined heights, e.g., between 0.3 meter and 0.8 meter, between 0.2 meter and 0.6 meter, between 0.4 meter and 1.0 meter, any range between 0.01 meter and 1000 meters, etc. The points included in the 3D point cloud correspond to points in the 2D plane after the projection. In other words, 2D plane points represent corresponding points included in the depth data (e.g., the 3D point cloud data).

In some embodiments, the clustering module 203 groups the 2D plane points into clusters based on their neighborhood search. For example, the clustering module 203 searches in the 2D plane for neighbors of a point and groups the point and the neighbor points into a cluster representing an object captured by the sensor 155. In some embodiments, the clustering module 203 identifies a certain point in the 2D plane, searches neighbor points for the certain points and also searches neighbor points for the neighbor points until no further neighbor points can be found. The clustering module 203 then groups the certain point, its neighbor points and the neighbor points for its neighbor points, if any, into a cluster that represents one object measured by the sensor 155. In some embodiments, the clustering module 203 assembles the 2D plane points into multiple clusters representing multiple objects measured by the sensor 155.

In some embodiments, the clustering module 203 filters the clusters to determine candidate leg clusters that may represent human legs captured by the sensor 155. For example, the clustering module 203 filters the clusters based on the shapes of the clusters. The clustering module 203 eliminates clusters having shapes that are not possible to represent human legs. In some embodiments, the clustering module 203 determines a size for a cluster and determines whether the size of the cluster meets certain criteria. For example, the clustering module 203 determines the width of a cluster and determines if the width of the cluster is within a certain range. For example, the certain range can be between 0.05 meter and 0.3 meter. In some embodiments, a width of a cluster can be the maximum dimension of the cluster in the 2D plane. For example, a width of a cluster is the dimension of the cluster along one coordinate (e.g., the x coordinate) in the 2D plane. In some embodiments, if the clustering module 203 determines that the width of a cluster is larger than 0.3 meter, the clustering module 203 eliminates the cluster from being a candidate leg cluster representing a human leg. If the clustering module 203 determines that the width of a cluster is smaller than 0.05 meter, the clustering module 203 excludes the cluster from being a candidate leg cluster. If the clustering module 203 determines that the width of a cluster is within the range from 0.05 meter to 0.3 meter, the clustering module 203 determines that the cluster can be a candidate leg cluster that may indicate a human leg.

This process can be shown as the following algorithm.

$\cup p_i = C_k,$ for $k=0 \ldots n$ if $\dim(C_k) < 0.3$ AND $\dim(C_k) > 0.05$, then $C_k \rightarrow L$.

In the algorithm described above, the symbol $C_k$ represents a cluster including a set of points that are represented by symbol $p_i$. The symbol $\dim(C_k)$ represents the maximum dimension of the cluster $C_k$ and the symbol L represents a cluster set including one or more candidate leg clusters. In some embodiments, the clustering module 203 sends the cluster set L describing one or more candidate leg clusters to the pairing module 205. In some embodiments, the clustering module 203 stores the candidate leg clusters set L in the storage device 197.

The pairing module 205 is code and routines for identifying a candidate leg cluster pair that includes two candidate leg clusters. For example, the pairing module 205 determines whether the two candidate leg clusters can form a pair indicating the legs of the same person based on the relative positions or the placement of the two candidate leg clusters. In some embodiments, the pairing module 205 determines a distance between the centers of the two candidate leg clusters in the 2D plane. The pairing module 205 determines whether the distance is within a certain range and determines that the two candidate leg clusters can form a pair if the distance is within the certain range. The certain range, for example, can be between 0.1 meter and 0.5 meter, between 0.3 meter and 0.8 meter, between 0.2 meter and 0.6 meter, between 0.4 meter and 1.0 meter, any range between 0.01 meter and 1000 meters, etc. In some embodiments, the pairing module 205 identifies a candidate leg cluster pair based upon determining that the distance between two candidate leg clusters is within the range from 0.1 meter to 0.5 meter. In some embodiments, the pairing module 205 sends data describing one or more candidate leg cluster pairs to the determination module 207. In some embodiments, the pairing module 205 stores data describing one or more candidate leg cluster pairs in the storage device 197. The pairing module 205 is communicatively coupled to the bus 220 via signal line 226.

The determination module 207 is code and routines for determining whether there is connectivity between the two candidate leg clusters included in the candidate leg cluster pair and determining that the candidate leg cluster pair is qualified to be a leg cluster pair indicating a person responsive to determining that there is connectivity between the two candidate leg clusters included in the candidate leg cluster pair. In some embodiments, the determination module 207 receives data describing one or more candidate leg cluster pairs from the pairing module 205. The determination module 207 determines whether a candidate leg cluster pair can indicate a person by testing the connectivity for the candidate leg cluster pair. The determination module 207 is communicatively coupled to the bus 220 via signal line 228.

In some embodiments, the determination module 207 matches the centers of the two candidate leg clusters in a pair represented by the 2D plane points back to points in the 3D point cloud. For example, the determination module 207 projects the 2D points representing the centers of the two candidate leg clusters back into the original 3D point cloud. For example, the determination module 207 chooses the closest points in the 3D point cloud that match the centers of the two candidate leg clusters. For purpose of clarity and convenience, the points in the 3D point cloud matching the centers of the two candidate leg clusters will be referred to as "center cloud points" or "centers" hereinafter.

In some embodiments, the determination module 207 propagates the center cloud points upwards to their neighbor points in the 3D point cloud. For example, the determination module 207 propagates the center points upwards to their neighbor points in the cloud until reaching at the hip height of a person. In some embodiments, the determination module 207 determines whether the connectivity between their neighbor points can be found. For example, the determination module 207 determines whether one of the neighbor points for one center can be connected to one of the neighbor points for the other center. If the determination module 207 determines that the neighbor points can be connected, the determination module 207 determines that there is connectivity between the two candidate leg clusters in the pair. In some embodiments, the determination module 207 determines if the neighbor points at the hip height can be connected. If so, the determination module 207 determines that there is connectivity between the two candidate leg clusters in the pair.

In some embodiments, responsive to determining that the connectivity between the two candidate leg clusters in the pair can be found, the determination module 207 determines that the candidate leg cluster pair is qualified to be a leg cluster pair indicating the presence of a person. In some embodiments, responsive to determining that the connectivity between the two candidate leg clusters in the pair can be found, the determination module 207 assign a high likelihood of an indication of a person to the candidate leg cluster pair. The determination module 207 then determines if the likelihood of an indication of a person is higher than a certain threshold represented by a value. For example, the threshold value can be one of 0.5, 0.6, 0.7, 0.8, 0.9 or any other number. If the likelihood of an indication of a person is higher than the certain value, the determination module 207 determines that the candidate leg cluster pair is qualified to be a leg cluster pair representing a person captured by the sensor 155. In some embodiments, the determination module 207 sends data describing the leg cluster pair that indicates the presence of a person to the estimation module 209. In some embodiments, the determination module 207 stores the data describing the leg cluster pair that indicates the presence of a person in the storage device 197.

The estimation module 209 is code and routines for estimating pose information for the detected person based on the data describing the leg cluster pair that indicates the presence of the person. For example, the pose information for a person includes position information describing a position for the person and/or orientation information describing a direction towards which the person is facing. In some embodiments, the estimation module 209 determines a position of the person based on the cloud points forming the leg cluster pair. For example, the estimation module 209 determines a center or a midpoint between the two leg clusters included in the leg cluster pair. The estimation module 209 estimates a position for the person based on the center or the midpoint. For example, the estimation module 209 determines that the person is located at the position indicated by the center or the midpoint. In some embodiments, the estimation module 209 estimates an orientation for the person based on the connectivity found between the two leg clusters in the pair. For example, the estimation module 209 determines the person is facing the normal vector of the connectivity. In some embodiments, the estimation module 209 sends the pose information to the interface 175. In some embodiments, the estimation module 209 stores the pose information in the storage device 197.

Methods

Referring now to FIGS. 3-6, various embodiments of the method of the specification will be described.

Figure 3:
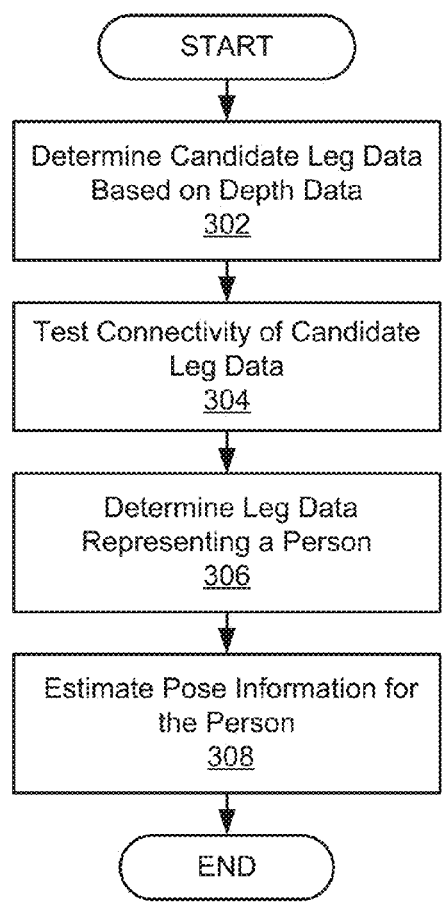
FIG. 3 is a flow diagram illustrating a method for detecting a person and estimating pose information for the person according to one embodiment.

FIG. 3 is a flow diagram illustrating a method 300 for detecting a person and estimating pose information for the person according to one embodiment. The method 300 can include determining 302 candidate leg data based on depth data. For example, the depth data is 3D point cloud data generated by a 3D depth sensor 155. The clustering module 203 clusters the 3D point cloud data and determines candidate leg data describing two or more candidate leg clusters. Each candidate leg cluster includes 3D cloud points that may represent a human leg measured by the sensor 155. The pairing module 203 identifies a candidate leg cluster pair from the two or more candidate leg clusters based on the relative positions of the candidate leg clusters. The method 300 may also include testing 304 the connectivity of the candidate leg data. For example, the determination module 207 determines if the connectivity between the candidate leg clusters in the pair can be found. The method 300 can include determining 306 leg data representing a person. For example, if the determination module 207 determines that the connectivity between the candidate leg clusters in the pair can be found, the determination module 207 determines the candidate leg cluster pair is qualified to be leg data representing a person. The method 300 can also include estimating pose information for the person. For example, the estimation module 209 estimates position information and orientation information for the person based on the leg data representing the person.

Figure 4:
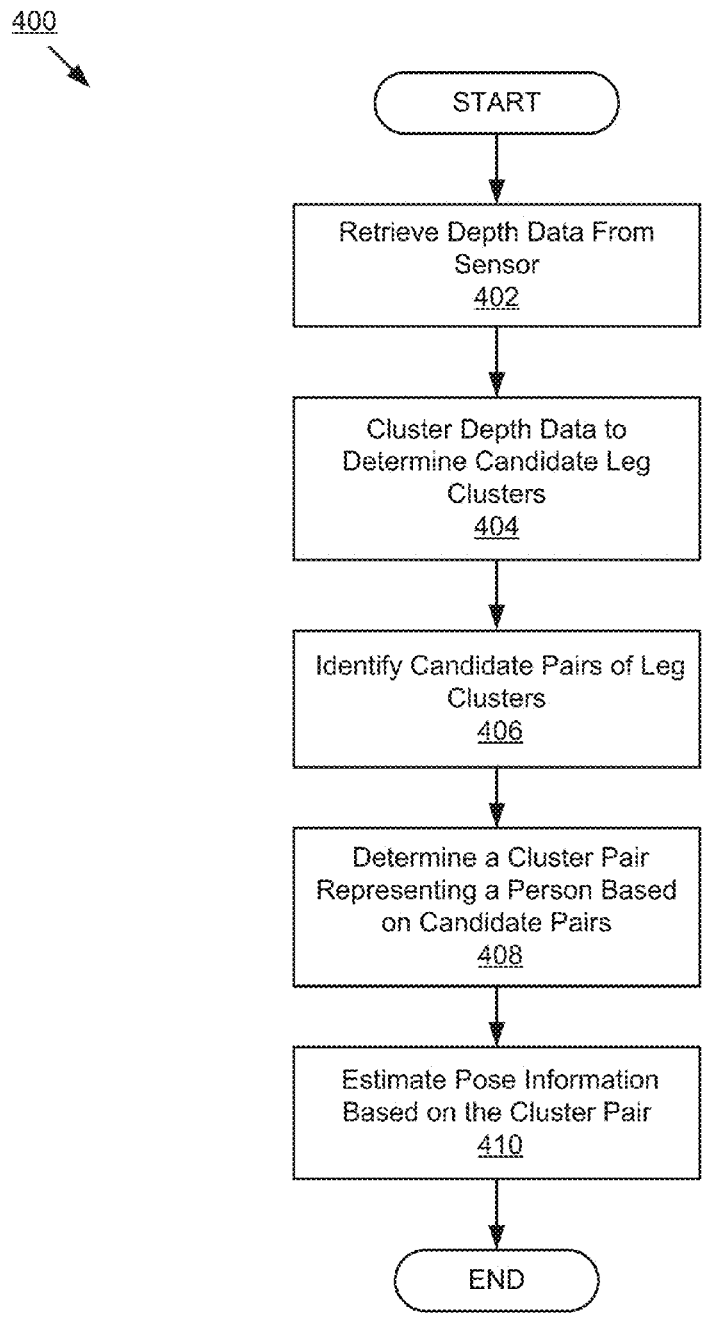
FIG. 4 is a flow diagram illustrating a method for detecting a person and estimating pose information for the person according to another embodiment.

FIG. 4 is a flow diagram illustrating a method 400 for detecting a person and estimating pose information for the person according to another embodiment. The method 400 can include retrieving 402 depth data from a sensor 155. For example, the communication module 201 is instructed by the clustering module 203 to retrieve 3D depth data generated by 3D depth sensor 155. The method 400 can also include clustering 404 the depth data to determine candidate leg clusters. For example, the depth data is 3D point cloud data. The clustering module 203 clusters the 3D point cloud data and determines two or more candidate leg clusters including 3D points that may represent human legs measured by the sensor 155. The method 400 can include identifying 406 candidate pairs of leg clusters. For example, the pairing module 203 identifies candidate leg cluster pair from the two or more candidate leg clusters based on the placement of the two or more candidate leg clusters. The method 400 can also include determining 408 a cluster pair representing a person based on the candidate pairs. For example, the determination module 207 determines if the connectivity between the candidate leg clusters in the pair can be found. If the determination module 207 determines that the connectivity between the candidate leg clusters in the pair can be found, the determination module 207 determines the candidate leg cluster pair is qualified to be a leg cluster pair representing a person. The method 400 can also include estimating 410 pose information based on the cluster pair. For example, the estimation module 209 estimates position information and orientation information for the person based on the leg cluster pair representing the person.

Figure 5:
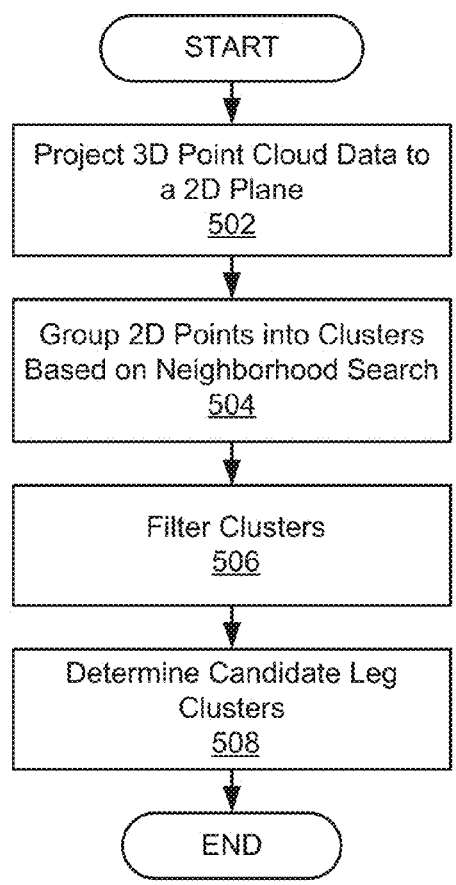
FIG. 5 is a flow diagram illustrating a method for clustering depth data to determine candidate leg clusters according to one embodiment.

FIG. 5 is a flow diagram illustrating a method 500 for clustering depth data to determine candidate leg clusters according to one embodiment. The method 500 can include projecting 502 3D point cloud data to a 2D plane. For example, the clustering module 203 receives depth data that is in the format of a 3D point cloud. The clustering module 203 projects cloud points in the 3D point cloud to a 2D plane. As a result, cloud points in the 3D point cloud match points in the 2D plane. The method 500 can also include grouping 504 points in the 2D plane into clusters based on a neighborhood search. For example, the cluster module 203 identifies a certain point in the 2D plane, searches neighbor points for the certain points and groups the certain point and its neighbor points into a cluster that represents one object measured by the sensor 155. The method 500 may also include filtering 506 clusters based on the sizes of the clusters. For example, the clustering module 203 determines if the width of a cluster is within a certain range, e.g., from 0.05 meter to 0.3 meter. If so, the clustering module 203 assigns the cluster to a candidate leg cluster set including one or more candidate leg clusters. The method 500 can include determining 508 candidate leg clusters. For example, the clustering module 203 determines candidate leg clusters based on the candidate leg cluster set.

Figure 6:
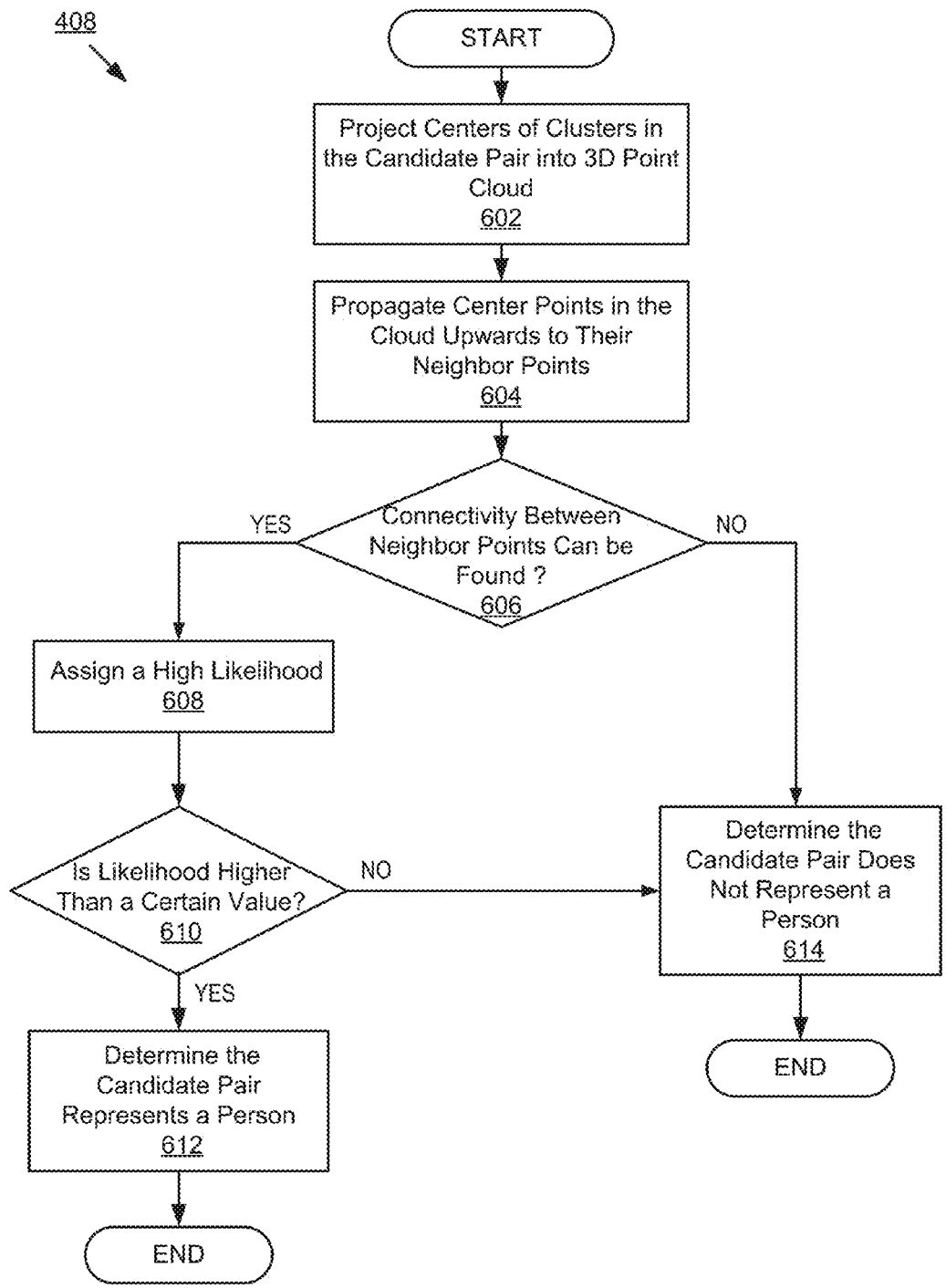
FIG. 6 is a flow diagram illustrating a method for determining a leg cluster pair representing a person according to one embodiment.

FIG. 6 is a flow diagram illustrating a method 600 for determining a leg cluster pair representing a person according to one embodiment. The method 600 can include projecting 602 centers of clusters in the candidate leg cluster pair into a 3D point cloud. For example, the determination module 207 projects the centers of the two candidate leg clusters in the pair back into the original 3D point cloud that has been retrieved from the sensor 155 as depth data. The method 600 can also include propagating 604 center points in the 3D cloud upwards to their neighbor points. For example, the determination module 207 propagates the center points upwards to their neighbor points in the 3D cloud until reaching at the hip height of a person. The method 600 can include determining 606 if connectivity between the neighbor points can be found. For example, the determination module 207 determines if one of the neighbor points for one cluster center can be connected to one of the neighbor points for the other cluster center. If no connectivity between the neighbor points can be found, the method 600 may include determining 614 that the candidate leg cluster pair does not represent a person.

If connectivity between the neighbor points can be found, the method 600 may include assigning 608 a high likelihood to the candidate leg cluster pair. For example, the high likelihood indicates that the candidate leg cluster pair may represent a person captured by the sensor 155 with a high probability. The method 600 can also include determining 610 if the likelihood is higher than a certain value. For example, the determination module 207 determines if the likelihood is higher than at least one of 0.5, 0.6, 0.7, 0.8 and 0.9. If the likelihood is higher than the certain value, the method 600 can include determining 612 that the candidate leg cluster pair is qualified to be a leg cluster pair representing a person captured by the sensor 155. If the likelihood is not higher than the certain value, the method 600 can include determining 614 that the candidate leg cluster pair does not represent a person.

Figure 7A:
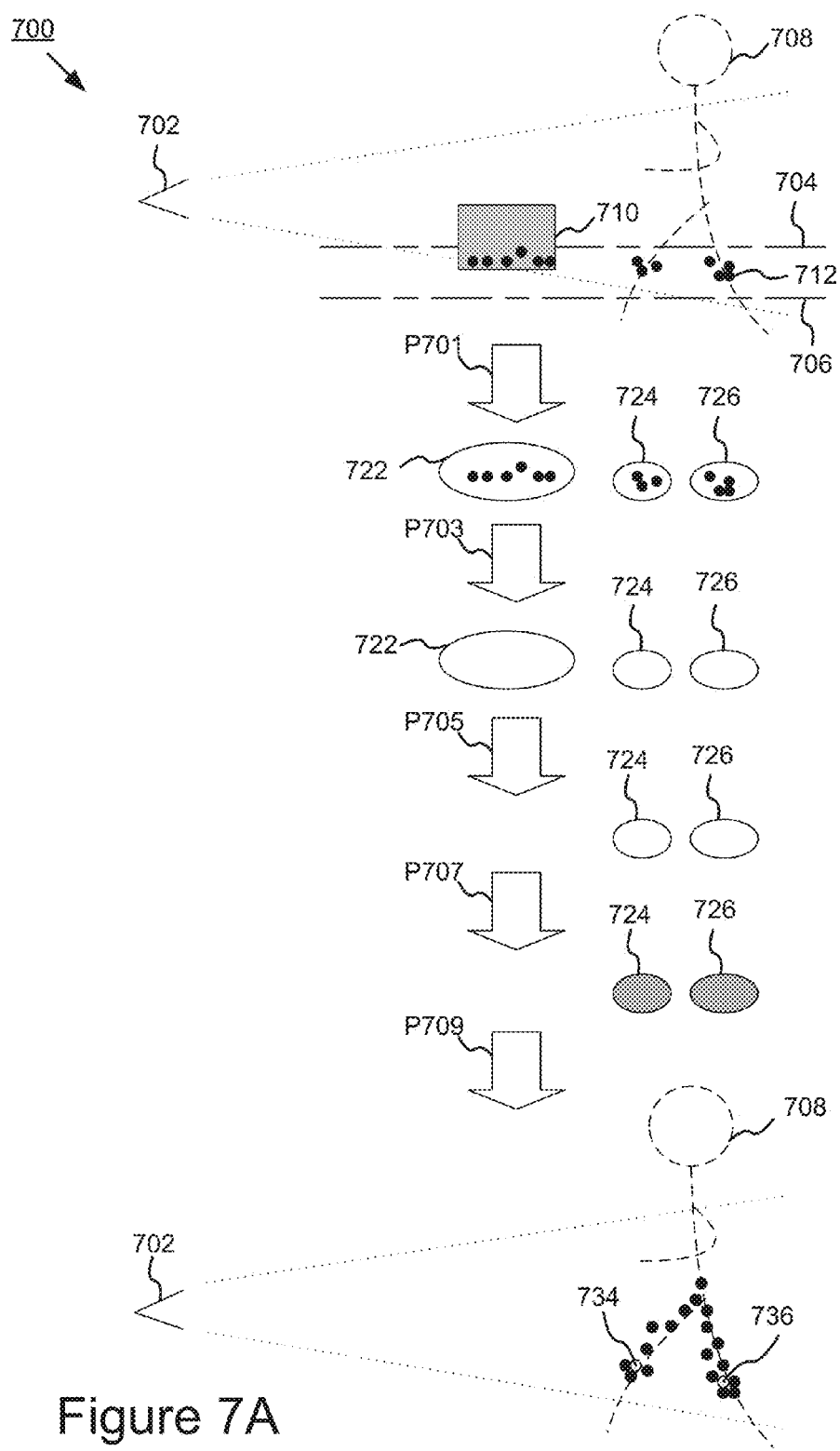
FIGS. 7A-7B are graphical representations illustrating a process for detecting a person and estimating pose information for the person according to one embodiment.
Figure 7B:
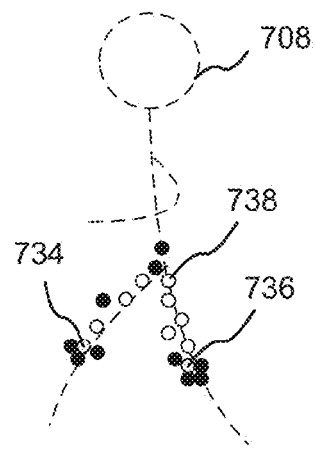
Figure 7B:
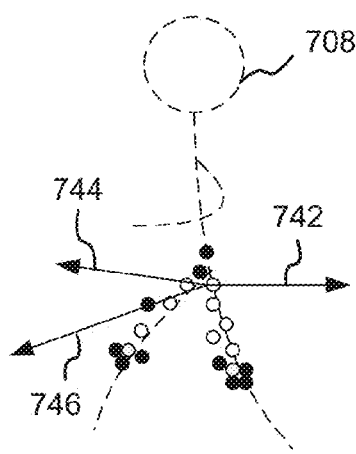

FIGS. 7A-7B are graphical representations illustrating a process for detecting a person and estimating pose information for the person according to one example. Referring now to FIG. 7A, element 702 is a graphical representation for a sensor 155. Elements 704, 706 are graphical representations for two heights that define a range of height used for projecting 3D point cloud data to a 2D plane. For example, the height 704 and the height 706 can be 0.8 meter and 0.2 meter, respectively. Element 708 is a graphical representation for a person captured by the sensor 702. Element 710 is a graphical representation for an object captured by the sensor 702. Elements 712 are graphical representations for multiple points in the 2D plane representing portions of the person or portions of the object captured by the sensor 702.

Element P701 is a graphical representation for a process implemented by the system 100 as described above to group the points 712 into clusters. Elements 722, 724, 726 are graphical representations for clusters formed by the points 712. Element P703 is a graphical representation for a process implemented by the system 100 as described above to determine two or more clusters. Element P705 is a graphical representation for a process implemented by the system 100 as described above to filter the two or more clusters to determine two or more candidate leg clusters. For example, cluster 722 is eliminated from being a candidate leg cluster after the process P705 and clusters 724, 726 are determined to be candidate leg clusters. Element P707 is a graphical representation for a process implemented by the system 100 as described above to identify a candidate leg cluster pair including two candidate leg clusters. For example, clusters 724, 726 are identified to form a candidate leg cluster pair after the process P707. Element P709 is a graphical representation for a process implemented by the system 100 as described above to project center points of the candidate leg clusters in the pair to a 3D point cloud. Elements 734, 736 are graphical representations for the center points of the candidate leg clusters 724, 726 in the pair.

Referring now to FIG. 7B, element P711 is a graphical representation for a process implemented by the system 100 as described above to apply a connectivity test to the candidate leg cluster pair. Elements 738 are graphical representations for neighbor points of the centers 734, 736. For example, the neighbor points 738 for the center points 734, 736 are determined by propagating the center points 734, 736 vertically upwards. The neighbor points 738 are tested to determine if connectivity can be found between them at the hip height. If connectivity between the neighbor points 738 can be found at the hip height, the candidate leg cluster pair is determined to be qualified as a leg cluster pair representing a person captured by the sensor 702. Element P713 is a graphical representation for a process implemented by the system 100 as described above to estimate pose information for the person represented by the leg cluster pair. Elements 742, 744, 746 are graphical representations for pose information describing a position and an orientation for the person detected.

Figure 8:
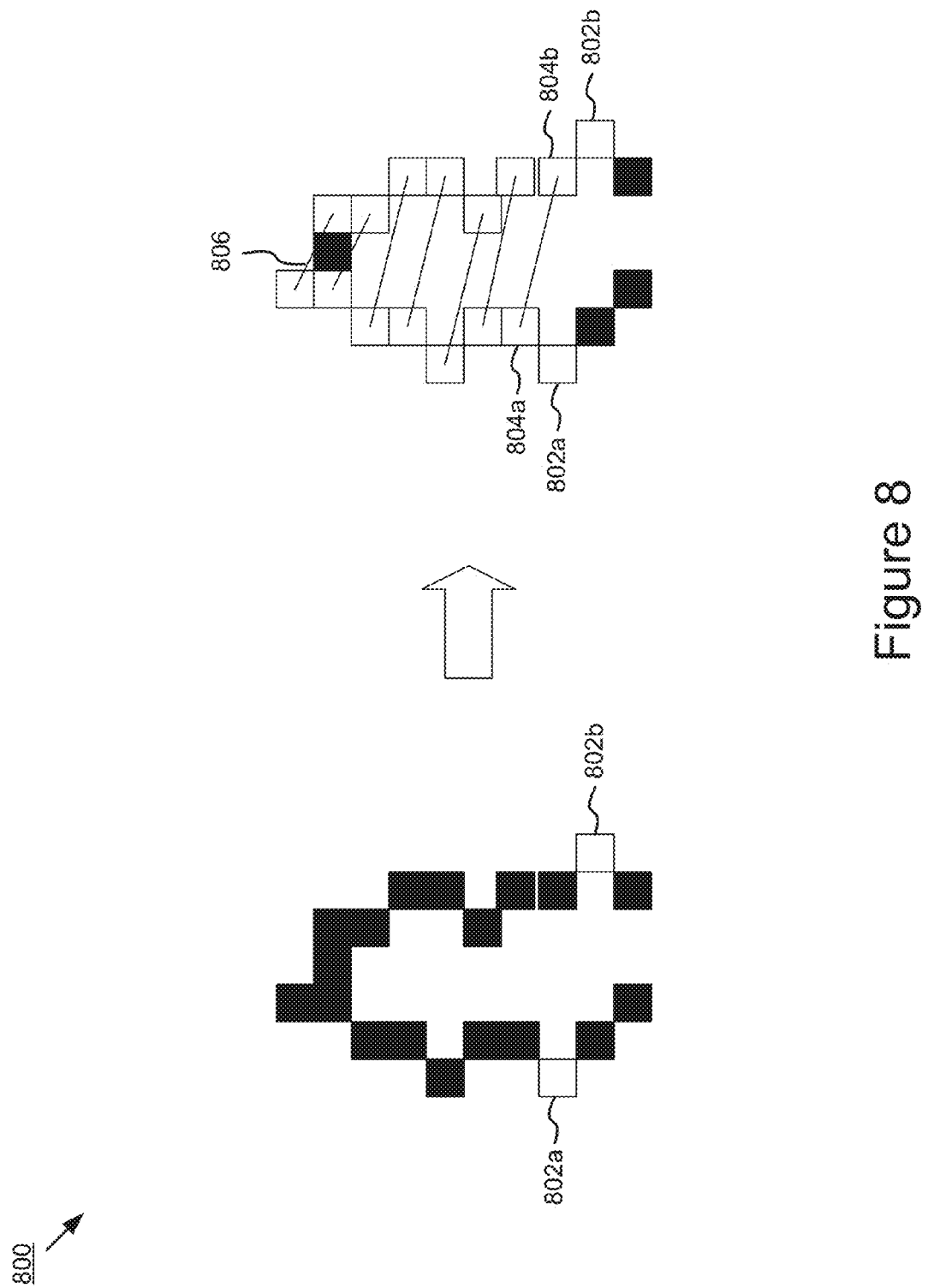
FIG. 8 is a graphical representation illustrating an upward propagation and a connectivity test according to one embodiment.

FIG. 8 is a graphical representation illustrating an upward propagation and a connectivity test according to one example. Elements 802a, 802b are graphical representations for center points of two candidate leg clusters included in a candidate leg cluster pair. Element 804a is a graphical representation for a neighbor point of the center point 802a as a result of propagating the center point 802a upwards in the 3D point cloud. Element 804b is a graphical representation for a neighbor point of the center point 802b as a result of propagating the center point 802b upwards in the 3D point cloud. Element 806 is a graphical representation for a connectivity between the neighbor points of the two center points 802a, 802b in the 3D point cloud.

Figure 9:
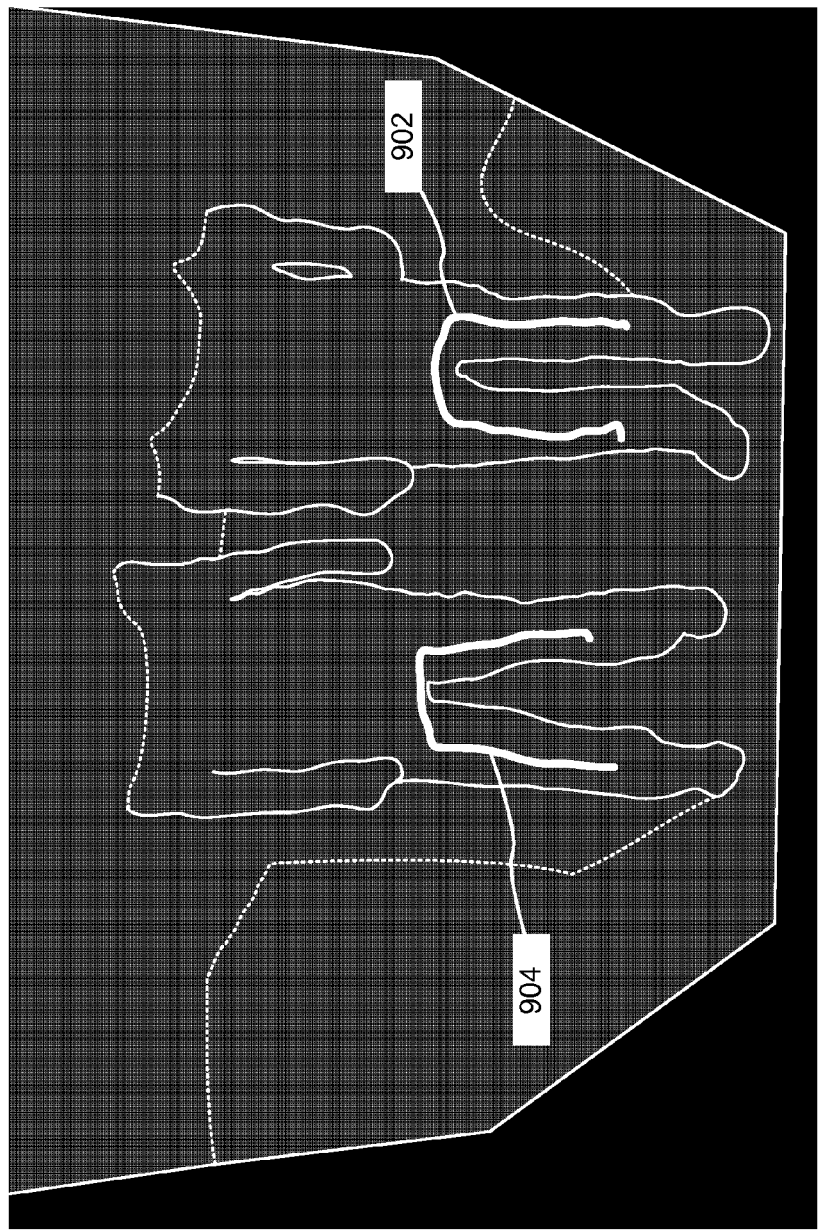
FIG. 9 is a graphical representation illustrating a result showing two detected persons based on a successful connectivity test according to one embodiment.

FIG. 9 is a graphical representation illustrating a result showing two detected persons based on a successful connectivity test according to one example. Elements 902, 904 are graphical representations for two successful connectivity tests based on an upward point propagation. For example, the two successful connectivity tests 902, 904 indicate that two persons are detected as a result.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method, comprising:
retrieving depth data from a sensor, the depth data describing distance information associated with one or more objects detected by the sensor;
clustering the depth data to determine two or more candidate leg clusters, each candidate leg cluster including a portion of the depth data that may represent a human leg detected by the sensor;
identifying a candidate leg cluster pair based on the two or more candidate leg clusters, the candidate leg cluster pair including two candidate leg clusters within a certain distance between each other, the two candidate leg clusters including center points and neighbor points surrounding the center points;
propagating from the center points of the two candidate leg clusters included in the candidate leg cluster pair upwards to the neighbor points of the two candidate leg clusters that are represented by portions of the depth data;
determining a connectivity between the neighbor points of the two candidate leg clusters;
responsive to determining the connectivity between the neighbor points of the two candidate leg clusters, determining that there is a connectivity between the two candidate leg clusters included in the candidate leg cluster pair; and
responsive to determining that there is the connectivity between the two candidate leg clusters included in the candidate leg cluster pair, determining that the candidate leg cluster pair is qualified to be a leg cluster pair representing a person detected by the sensor.

2. The method of claim 1, wherein clustering the depth data to determine the two or more candidate leg clusters further comprises:

projecting the depth data into a two dimensional plane, the two dimensional plane including points that represent the depth data; and grouping the points in the two dimensional plane into two or more object clusters, each object cluster including two or more points adjacent to each other.

3. The method of claim 2, wherein clustering the depth data to determine the two or more candidate leg clusters further comprises:

filtering the two or more object clusters based on sizes of the two or more object clusters; and determining the two or more candidate leg clusters from the two or more object clusters based on the filtering.

4. The method of claim 1, wherein propagating from the center points of the two candidate leg clusters included in the candidate leg cluster pair upwards to the neighbor points of the two candidate leg clusters that are represented by portions of the depth data further comprises matching the center points of the two candidate leg clusters included in the candidate leg cluster pair to points in a three dimensional point cloud.

5. The method of claim 1, wherein the depth data is a three dimensional point cloud.

6. The method of claim 1 further comprising:

determining position information associated with the leg cluster pair; and estimating a pose for the person detected by the sensor based on the position information associated with the leg cluster pair.

7. A system comprising:

a processor; and a memory storing instructions that, when executed, cause the system to:

retrieve depth data from a sensor, the depth data describing distance information associated with one or more objects detected by the sensor;

cluster the depth data to determine two or more candidate leg clusters, each candidate leg cluster including a portion of the depth data that may represent a human leg detected by the sensor;

identify a candidate leg cluster pair based on the two or more candidate leg clusters, the candidate leg cluster pair including two candidate leg clusters within a certain distance between each other, the two candidate leg clusters including center points and neighbor points surrounding the center points;

propagate from the center points of the two candidate leg clusters included in the candidate leg cluster pair upwards to the neighbor points of the two candidate leg clusters that are represented by portions of the depth data;

determine a connectivity between the neighbor points of the two candidate leg clusters;

responsive to determining the connectivity between the neighbor points of the two candidate leg clusters, determine that there is a connectivity between the two candidate leg clusters included in the candidate leg cluster pair; and responsive to determining that there is the connectivity between the two candidate leg clusters included in the candidate leg cluster pair, determine that the candidate leg cluster pair is qualified to be a leg cluster pair representing a person detected by the sensor.

8. The system of claim 7, wherein clustering the depth data to determine the two or more candidate leg clusters further comprises:

projecting the depth data into a two dimensional plane, the two dimensional plane including points that represent the depth data; and grouping the points in the two dimensional plane into two or more object clusters, each object cluster including two or more points adjacent to each other.

9. The system of claim 8, wherein clustering the depth data to determine the two or more candidate leg clusters further comprises:

filtering the two or more object clusters based on sizes of the two or more object clusters; and determining the two or more candidate leg clusters from the two or more object clusters based on the filtering.

10. The system of claim 7, wherein propagating from the center points of the two candidate leg clusters included in the candidate leg cluster pair upwards to the neighbor points of the two candidate leg clusters that are represented by portions of the depth data further comprises matching the center points of the two candidate leg clusters included in the candidate leg cluster pair to points in a three dimensional point cloud.

11. The system of claim 7, wherein the depth data is a three dimensional point cloud.

12. The system of claim 7, wherein the instructions, when executed, cause the system to also:

determine position information associated with the leg cluster pair; and estimate a pose for the person detected by the sensor based on the position information associated with the leg cluster pair.

13. A computer program product comprising a non-transitory computer readable medium encoding instructions that, in response to execution by a computing device, cause the computing device to perform operations comprising:

retrieving depth data from a sensor, the depth data describing distance information associated with one or more objects detected by the sensor;

clustering the depth data to determine two or more candidate leg clusters, each candidate leg cluster including a portion of the depth data that may represent a human leg detected by the sensor;

identifying a candidate leg cluster pair based on the two or more candidate leg clusters, the candidate leg cluster pair including two candidate leg clusters within a certain distance between each other, the two candidate leg clusters including center points and neighbor points surrounding the center points;

propagating from the center points of the two candidate leg clusters included in the candidate leg cluster pair upwards to the neighbor points of the two candidate leg clusters that are represented by portions of the depth data;

determining a connectivity between the neighbor points of the two candidate leg clusters;

responsive to determining the connectivity between the neighbor points of the two candidate leg clusters, determining that there is a connectivity between the two candidate leg clusters included in the candidate leg cluster pair; and responsive to determining that there is the connectivity between the two candidate leg clusters included in the candidate leg cluster pair, determining that the candidate leg cluster pair is qualified to be a leg cluster pair representing a person detected by the sensor.

14. The computer program product of claim 13, wherein clustering the depth data to determine the two or more candidate leg clusters further comprises:

projecting the depth data into a two dimensional plane, the two dimensional plane including points that represent the depth data; and grouping the points in the two dimensional plane into two or more object clusters, each object cluster including two or more points adjacent to each other.

15. The computer program product of claim 14, wherein clustering the depth data to determine the two or more candidate leg clusters further comprises:

filtering the two or more object clusters based on sizes of the two or more object clusters; and determining the two or more candidate leg clusters from the two or more object clusters based on the filtering.

16. The computer program product of claim 13, wherein propagating from the center points of the two candidate leg clusters included in the candidate leg cluster pair upwards to the neighbor points of the two candidate leg clusters that are represented by portions of the depth data further comprises matching the center points of the two candidate leg clusters included in the candidate leg cluster pair to points in a three dimensional point cloud.

17. The computer program product of claim 13, wherein the instructions, in response to execution by the computing device, cause the computing device to perform operations further comprising:

determining position information associated with the leg cluster pair; and estimating a pose for the person detected by the sensor based on the position information associated with the leg cluster pair.

* * * * *